US010212704B2

(12) United States Patent
Panteleev et al.

(10) Patent No.: US 10,212,704 B2
(45) Date of Patent: Feb. 19, 2019

(54) PACKET DATA UNIT MAPPING INTO TIME RESOURCE PATTERNS FOR EFFICIENT DEVICE-TO-DEVICE COMMUNICATIONS

(71) Applicant: Intel Corporation, Santa Clara, CA (US)

(72) Inventors: Sergey Panteleev, Nizhny Novgorod (RU); Sergey Sosnin, Zavolzhie (RU); Alexey Khoryaev, Nizhny Novgorod (RU); Debdeep Chatterjee, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/324,574

(22) PCT Filed: May 29, 2015

(86) PCT No.: PCT/US2015/033337

§ 371 (c)(1),
(2) Date: Jan. 6, 2017

(87) PCT Pub. No.: WO2016/022200

PCT Pub. Date: Feb. 11, 2016

(65) Prior Publication Data

US 2017/0215187 A1 Jul. 27, 2017

Related U.S. Application Data

(60) Provisional application No. 62/034,698, filed on Aug. 7, 2014.

(51) Int. Cl.

| | |
|---|---|
| ***H04W 72/04*** | (2009.01) |
| ***H04L 1/00*** | (2006.01) |
| ***H04L 5/00*** | (2006.01) |
| ***H04W 72/12*** | (2009.01) |
| ***H04L 1/18*** | (2006.01) |

(52) U.S. Cl.
CPC .......... *H04W 72/0446* (2013.01); *H04L 1/00* (2013.01); *H04L 1/1887* (2013.01);
(Continued)

(58) Field of Classification Search
None
See application file for complete search history.

(56) References Cited

U.S. PATENT DOCUMENTS

2013/0223353 A1 8/2013 Liu et al.
2014/0056220 A1 * 2/2014 Poitau .................. H04W 76/14 370/328

(Continued)

FOREIGN PATENT DOCUMENTS

CN 103024914 A 4/2013

OTHER PUBLICATIONS

Fujitsu et al. Further Analysis on Control Signal and Scheduling Assignment for D2D Communication.*

(Continued)

*Primary Examiner* — Jamaal R Henson
(74) *Attorney, Agent, or Firm* — Eschweiler & Potashnik, LLC

(57) ABSTRACT

A User Equipment (UE) device or network system facilitates direct device-to-device (D2D) communication with another UE device, in which a single scheduling assignment indicates the transmission of packet data units, their corresponding retransmissions, and a mapping scheme into an available resource pool. The UE device operates to switch between a D2D communication and a cellular network communication. A single SA transmission from the UE enables the D2D communication by providing mapping parameters for decoding a subsequent SA transmission and a detection of the PDUs within sub-frames between two SA transmissions.

23 Claims, 7 Drawing Sheets

(52) U.S. Cl.
CPC .......... *H04L 5/0032* (2013.01); *H04L 5/0082* (2013.01); *H04L 5/0092* (2013.01); *H04W 72/1263* (2013.01); *H04W 72/1278* (2013.01); *H04L 1/1896* (2013.01); *H04L 5/0023* (2013.01)

(56) References Cited

U.S. PATENT DOCUMENTS

| | | | | |
|---|---|---|---|---|
| 2014/0169298 | A1 | 6/2014 | Li et al. | |
| 2014/0269528 | A1 | 9/2014 | Zhu et al. | |
| 2014/0323126 | A1 | 10/2014 | Ro et al. | |
| 2015/0003322 | A1 | 1/2015 | Pyattaev et al. | |
| 2015/0036405 | A1 | 2/2015 | Venkatachalam et al. | |
| 2015/0055579 | A1 | 2/2015 | Wu et al. | |
| 2015/0065154 | A1 | 3/2015 | Van Phan et al. | |
| 2016/0044729 | A1 * | 2/2016 | Tu ......................... | H04W 74/04 370/329 |

OTHER PUBLICATIONS

Ericsson et al. "On Resource Allocation for Communication in Mode 1 and Mode 2", submitted by the Applicant.*

"Distributed Resource Allocation for D2D Communication." Agenda Item 6.2.5.2.1. Source; Intel Corporation, 3GPP TSG RAN WG1 Meeting #77, Seoul, Korea, May 19-23, 2014, R1-142016. 8 pages.

"eNB Controlled Resource Allocation for D2D Communication," Source: Intel Corporation. Agenda item: 6.2.6.2.2. 3GPP TSG RAN WG1 Meeting #77, Seuol, Korea, May 19-23, 2014. R1-142017. 6 pages.

"Further analysis on control signal and Scheduling Assignment for D2D communication." Source: Fujitsu. Agenda Item: 7.2.7.1.2. 3GPP TSG-RAN1 #76bis, Shenzhen, China, Mar. 31-Apr. 4, 2014. R1-141229. 7 pages.

Extended European Search Report dated Feb. 13, 2018 for European Patent Application EP15828920.7.

International Preliminary Report on Patentability dated Feb. 7, 2017, International Application PCT/US2015/033337. p. 1-13.

"RPT design for broadcast communication." Agenda Item 6.2.5.2. Source: CATT. 3GPP TSG RAN WG1 Meeting #77, Seoul, Korea, May 19-23, 2014, R1-142077. 5 pages.

"On control signaling and scheduling assignments for D2D." Agenda Item 6.2.5.1.2. Source: InterDigital. 3GPP TSG-RAN WG1 Meeting #77, Seoul, Korea, May 19-23, 2014. R1-142350. 5 pages.

"On resource allocation for communication in Mode 1 and Mode 2." Agenda Item 6.2.5.2. Source: Ericsson. 3GPP TSG-RAN WG1 Meeting #77, Seoul, South Korea, May 19-23, 2014. R1-142402, 6 pages.

"Mode 2 resource allocation for D2D communication." Agenda Item 6.2.5.2.1. Source: Kyocera 3GPP TSG RAN WG1 Meeting #77, Seoul, Korea, May 19-23, 2014. R1-142481. 5 pages.

International Search Report and Written Opinion of the International Searching Authority, International Application PCT/US2015/033337, dated Sep. 9, 2015.

* cited by examiner 200
206
212

UE
126
SCHEDULING COMPONENT
202
DERIVING COMPONENT
204
D2D COMMUNICATION COMPONENT
132
PDU MAPPING COMPONENT
134
128
UE
130
SA CYCLE
208
214
210

PACKET DATA UNIT MAPPING INTO TIME RESOURCE PATTERNS FOR EFFICIENT DEVICE-TO-DEVICE COMMUNICATIONS

REFERENCE TO RELATED APPLICATIONS

This application is a National Phase entry application of International Patent Application No. No. PCT/US2015/033337 filed May 29, 2015, which claims priority to U.S. Provisional Application No. 62/034,698, filed Aug. 7, 2014 entitled "METHODS OF PDU MAPPING INTO TIME RESOURCE PATTERNS FOR TRANSMISSIONS FOR EFFICIENT D2D COMMUNICATION" in the name of Sergey Panteleev, et al. and is hereby incorporated by reference in its entirety.

FIELD

The present disclosure relates to wireless communications, and more specifically, to the mapping of a packet data unit (PDU) into time resource patterns in device-to-device (D2D) communications.

BACKGROUND

3GPP standardizes device-to-device (D2D) operation/functionality to be supported in LTE Release 12 specification. Exploiting direct communication, such as in D2D communication between nearby mobile devices can improve spectrum utilization, overall throughput, and energy efficiency, while enabling new peer-to-peer and location-based applications and services. D2D-enabled LTE devices, for example, have the potential to become competitive for fallback public safety networks that can function when cellular networks are not available or otherwise fail in connection. Introducing D2D poses many new challenges and risks to the long-standing cellular architecture, which is based on or centered on a base station (BS). One issue to be resolved is how to share or communicate resources or other communication resources in D2D communications among mobile devices (e.g., user equipment) that can communicate in both cellular and D2D communications.

DETAILED DESCRIPTION

Figure 1:
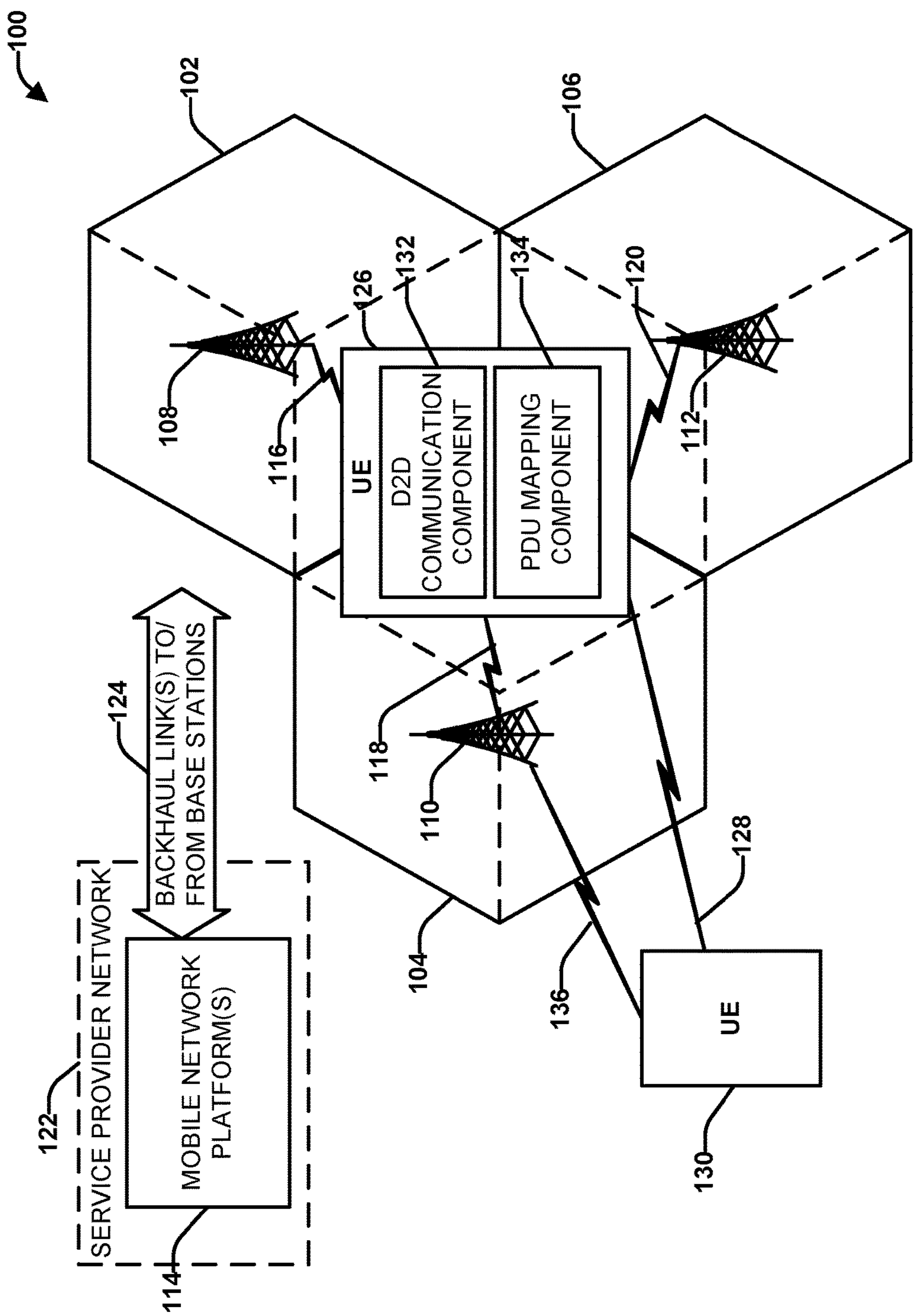
FIG. 1 is a block diagram illustrating a wireless communications environment for a UE configured to switch between a cellular network communication mode and a D2D communication mode that can be utilized according to various aspects.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor, a process running on a processor, a controller, a circuit or a circuit element, an object, an executable, a program, a storage device, a computer, a tablet PC and/or a mobile phone with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components or elements without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising".

In consideration of the above described deficiencies, a user equipment (UE) comprises a D2D transmitter (Tx) that sends control information in scheduling assignment (SA) sub-frames. Secondly, the D2D Tx initiates sending data according to the control information being broadcasted in SA sub-frames. However, details remain unsolved and defined in order to further support D2D communication. In particular, further defining the SA sub-frames, and how the transmission/re-transmission of packet data units (PDUs) can be mapped into a data resource pool with minimum signaling overhead remains. Control information, as used herein, can refer to data that describes physical parameters of a subsequent data transmission such as, for example, modulation and coding scheme, resources to be used for data transmission or mapping rules for decoding PDUs. Additional, aspects and details of the disclosure are further described below with reference to figures.

Referring to FIG. 1, illustrated is an example wireless environment 100 in accordance to various aspects being disclosed. In particular, the example wireless environment 100 illustrates a set of wireless network macro cells 102, 104, and 106. It is noted however that wireless cellular network deployments within the wireless environment 100 can encompass any number of macro cells. Coverage macro cells 102, 104, and 106 are illustrated as hexagons, but coverage cells can adopt other geometries generally dictated by a deployment configuration or floor plan, geographic areas to be covered, or other factors. Each macro cell 102, 104, and 106 can be sectorized in a 2π/3 configuration, in which each macro cell includes three sectors as an example demarcated with dashed lines in FIG. 1.

It is noted that other sectorizations are possible, and aspects or features of the disclosed subject matter can be exploited regardless of type of sectorization. Macro cells 102, 104, and 106 are served respectively through macro cell network devices, base stations or eNodeBs 108, 110, and 112. It is noted that radio communication component(s) are functionally coupled through links such as cables (e.g., RF and microwave coaxial lines), ports, switches, connectors, and the like, to a set of one or more antennas that transmit and receive wireless signals (not illustrated). It is noted that a radio network controller (not shown), which can be a part of mobile network platform(s) 114, and set of base stations (e.g., eNodeB 108, 110, and 112) that serve a set of macro cells; electronic circuitry or components associated with the base stations in the set of base stations; a set of respective wireless links (e.g., links 116, 118, and 120) operated in accordance with a radio technology through the base stations 108, 110, and 112, form a macro radio access network. It is further noted that, based on network features, the radio controller can be distributed among the set of base stations 108, 110, and 112 or associated radio equipment. In an aspect, for universal mobile telecommunication system-based networks, wireless links 116, 118, and 120 can embody a Uu interface (universal mobile telecommunication system Air Interface).

Mobile network platform(s) 114 facilitates, for example, circuit switched-based (e.g., voice and data) and packet-switched (e.g., Internet protocol, frame relay, or asynchronous transfer mode) traffic and signaling generation, as well as delivery and reception for networked telecommunication via a user equipment (UE) 126 (e.g., mobile or wireless device) or a UE 130, in accordance with various radio technologies for disparate markets. Telecommunication is based at least in part on standardized protocols for communication determined by a radio technology utilized for communication. In addition, telecommunication can exploit various frequency bands, or carriers, which include any electromagnetic frequency bands licensed by the service provider network 122 (e.g., personal communication services, advanced wireless services, general wireless communications service, and so forth), and any unlicensed frequency bands currently available for telecommunication. In addition, mobile network platform(s) 114 can control and manage base stations 108, 110, and 112 and radio component(s) associated thereof, in disparate macro cells 102, 104, and 106 by way of, for example, a wireless network management component (e.g., radio network controller(s), cellular gateway node(s), etc.). Moreover, wireless network platform(s) can integrate disparate networks (e.g., Wi-Fi network(s), femto cell network(s), broadband network(s), service network(s), enterprise network(s), and so on). In cellular wireless technologies (e.g., third generation partnership project universal mobile telecommunication system, global system for mobile communication, etc.), mobile network platform 114 can be embodied in the service provider network 122.

In addition, wireless backhaul link(s) 124 can include wired link components such as a T1/E1 phone line, a T3/DS3 line, a digital subscriber line either synchronous or asynchronous; an asymmetric digital subscriber line; an optical fiber backbone; a coaxial cable, etc.; and wireless link components such as line-of-sight or non-line-of-sight links which can include terrestrial air-interfaces or deep space links (e.g., satellite communication links for navigation). In an aspect, for universal mobile telecommunication system-based networks, wireless backhaul link(s) 124 embodies an IuB interface. It is noted that while an exemplary wireless environment 100 is illustrated for macro cells and macro base stations, aspects, features and advantages of the disclosed subject matter can be implemented in small cells, micro cells, pico cells, femto cells, or the like.

The wireless environment 100 illustrates further aspects comprising the UE device 126 in communication with another UE 130. The UE 126 is configured to switch between a cellular network mode of communication and a D2D mode of communication. In the D2D mode of communication, the UE 126 communicates directly with the UE 130 via a wireless communication link 128. In the cellular network mode of communication, the cellular networks associated with the macro cells 102, 104, or 106 are utilized to facilitate a communication with the UE 130 (e.g., via the link 136 and the base station 110).

In addition, the UE 126 includes a device-to-device (D2D) communication component 132 and a PDU mapping component 134. The UE 126 can use these components to generate and control communications directly from the UE 126 to the UE 130 while in the D2D communication mode without the intercession of the base station 110. An advantage of the D2D communication mode by the UE 126 is that a higher data rate than a cellular network communication mode alone can be experienced due to a shorter range of communications via the link 128 than the links 118 and 136, for example. Further, the UEs 126, 130 or other mobile devices operating within one or more macro cells 102, 104, or 106 could benefit from D2D communications, as the D2D communications can help offload traffic from one or more congested cell networks (e.g. macro cells 102, 104, or 106). For example, as more D2D configured UEs (e.g. UE 126) operate within the macro cells 102, 104, or 106, these networks could have more available spectrum for other network devices and further limit potential interference.

The D2D communication component 132 of the UE 126 can comprise a transceiver, a transmitter, a receiver or the like that facilitates a communication directly to another UE device 130. The D2D communication component 132 can operate to switch between a D2D communication mode and a cellular network communication mode. The D2D communication component 132 can transmit or receive D2D data via the D2D communication link 136. The D2D data, for example, can comprise one or more physical parameters in a single transmission that are related to subsequent transmissions. These physical parameters can enable or facilitate the UE 130 to recognize a subsequent D2D communication being received by utilizing the parameters provided as control information within the D2D data transmission. The D2D communication component could likewise transmit D2D data from the UE 126 to the UE 130 as well, in which the UE 130 could also decode subsequent transmissions based on physical parameters from the UE 126 also.

The D2D data can be data housed in packets or data containers of a SA in a single transmission. As discussed above, the SA comprises control information that describes the physical parameters of a subsequent transmission to allow for modulation and coding schemes, resources for data transmission, rules for decoding the D2D data or other related information for processing or decoding D2D data at the UE 126 or the UE 130, for example. The parameters can include an amount of PDUs or an indication of the number of PDUs to be transmitted in a subsequent transmission from the UE 126. The parameters can also include a number of PDU retransmissions for each PDU, particular time instances that correspond to transmissions of the PDUs, particular time instances corresponding to retransmissions corresponding to each PDU. These parameters could be the same for all subsequent transmissions, in which each transmission can separated by a different SA, or the parameters could vary depending on the variance of each subsequent transmission between SAs, for example.

A particular transmission or SA transmission, for example, can be indicated by an SA frame or sub-frame with control information, and further include a plurality of sub-frames that are time transmission intervals (TTIs) between each SA scheduling cycle or transmission (e.g., 24, 36, more sub-frames, or less sub-frames). The TTIs can be designated as sub-frames of an available logical resource pool, or as resources available between SA transmissions, which can be communicated or received in a predefined or set period of time, or in a single transmission. An SA region can refer to the logical resource pool for potential SA transmissions, which can include the time or interval for all transmission opportunities for a current D2D node (e.g., UE, or other network device, or resource in a D2D transmission). In addition, a particular SA scheduling cycle can refer to D2D data sub-frames available between two SA transmissions, SA cycles, or two particular SA sub-frames at different time instances, for example.

The PDU mapping component 134 is configured to map PDUs of the D2D data into a time resource pattern for transmission (T-RPT) based on a PDU mapping scheme. The PDU mapping scheme can comprise a consecutive mapping scheme, an interleaved mapping scheme, a pseudo-random mapping scheme, or other generated patterns or mapping schemes (processes) by which to map PDUs according to a set of mapping rules into a T-RPT. The PDUs can include an initial PDU and one or more retransmissions of the initial PDU, which facilitate direct communications or communication data between the UE 126 and the UE 130. Each PDU or retransmission, for example, can also comprise one or more sub-frames or TTIs within an SA cycle or transmission. Each transmission can further comprise a single set of PDUs including an initial PDU and corresponding retransmissions or multiple sets of PDUs with multiple initial PDUs and retransmissions associated with each initial PDU. In addition, a PDU, a corresponding PDU retransmission or both can include a subset (less than all) of the sub-frames for a particular SA scheduling cycle or transmission, for example.

In one aspect, the PDU mapping can comprise a consecutive mapping scheme, as selected by the UE 126, in which the D2D communication component is further configured to transmit one or more retransmissions of a PDU consecutively after initially transmitting an initial PDU. The consecutive retransmissions for example and can be interspersed through the TTIs available within each SA scheduling cycle/transmission or between two SA transmissions, in which each PDU and each PDU retransmission is consecutively mapped and comprises multiple sub-frames of TTIs each.

In addition or alternatively, the PDU mapping scheme can comprise an interleaved PDU mapping or another non-consecutive mapping scheme, wherein the D2D communication component is configured to interleave retransmissions corresponding to a PDU in sub-frames between SA transmissions after transmitting the PDU, for example. The retransmissions can further be interleaved with the corresponding initial PDU in a way that a portion of each PDU can be comprises by a sub-frame or TTI. These portions of each PDU can be interleaved throughout the SA scheduling cycle or transmission and interleaved in the same or different orders, sequences or time instances of different sub-frames. For example, a first part of an initial PDU could follow with a first part of a retransmission of that PDU, in which empty or non-PDU containing sub-frames follow, and a first part of a third retransmission comes next before a second part of a PDU/retransmission.

Other interleaved patterns can also be envisioned and are not limited herein, in which further details and discussions are highlighted below with subsequent figures. In one aspect, the PDU mapping component 134 equidistantly maps the initial PDU transmission and retransmissions into a T-RPT according to an example of a mapping rule. Alternatively, only the retransmissions or only the initial PDUs could be mapped equidistantly. One of the parameters, for example, such as a number of PDUs (initial PDU or corresponding retransmissions) to be subsequently transmitted (as indicated in the SA or control information, for example) could be used to factor PDU positions within an SA cycle 208. One or more other parameters or criteria described herein can also be utilized for decoding the positions, timing, data content, etc. of the PDUs.

In addition or alternatively, the PDU mapping scheme or processes can comprise a pseudo-random PDU mapping, in which a PDU and corresponding retransmissions are mapped within each SA scheduling cycle/transmission in a pseudo-random process. For example, the D2D communication component 132 can operate to transmit a PDU and retransmissions corresponding to the PDU based on a random sequencing of sub-frames associated with the PDU and sub-frames associated with each of the retransmissions. The PDU mapping component 134 can generate various random sequences of permuted indexes, for example based on a pseudo-random function. This pseudo-random function can be based on one or more parameters, including, but not limited to, a D2D transmitter/group identity, a position of the SA message transmission in the SA logical resource pool, the SA cycle or period, a number of PDUs, a number of retransmissions, time instances for initial PDUs, time instances for retransmissions, or the other D2D communication related parameters, for example.

In another aspect, the PDU mapping component 134 can be configured to select the PDU mapping scheme from among a plurality of PDU mapping schemes based on a set of predetermined criteria. The predetermined criteria, for example, can be whether a set mapping scheme is indicated, or a variable mapping scheme, in which a set mapping scheme could be generated or selected from among the mapping schemes or different mapping schemes. The mapping scheme rules can be predetermined in each UE 126 or 130 or provided for within the control information or other resources of an SA transmission. The mapping scheme could alter among SA transmissions or be consistent, alter among different communication links 128 with one or more different UEs or be the same. Another predetermined criteria, for example, could be a level of complexity (e.g. in encryption, security, etc.) that a UE 126 could set for the particular D2D link with a particular UE 130, as well as a scheduling decision, a traffic load or type, latency requirements, power consumption level desired for QoE or QoS or other criteria, for example.

Figure 2:
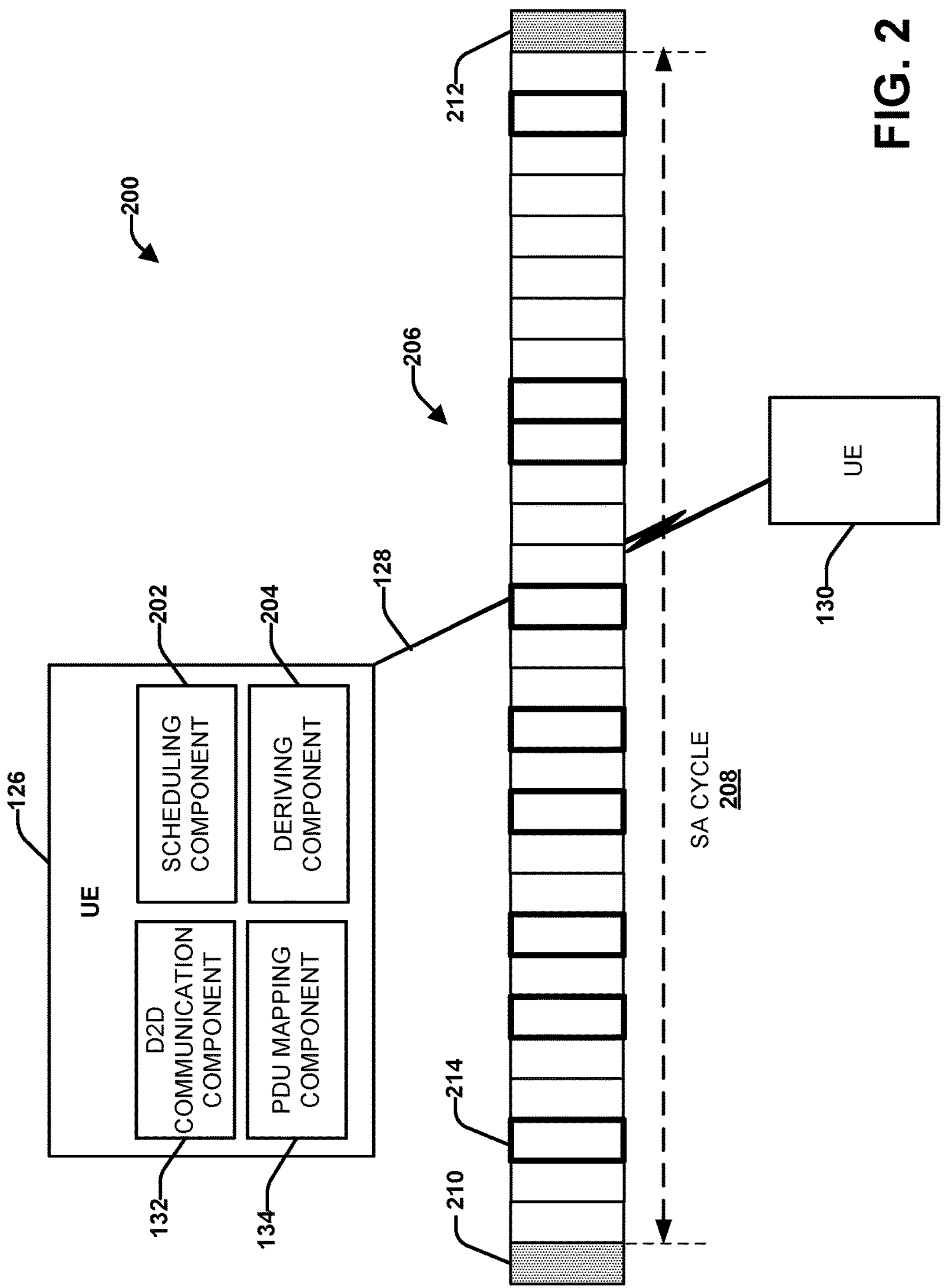
FIG. 2 is a UE in D2D communication mode communicating with D2D data that can be utilized according to various aspects.

Referring to FIG. 2, illustrated is an example of a system or communication environment 200 that utilizes a logical resource pool for communicating D2D data among D2D communications of UEs in accordance with various aspects being described. The UE 126 is configured to communicate in a D2D communication mode directly to the UE 130. Although the UE 126 can communicate via a cellular network in cellular communication mode to the UE 130, the UE 126 can also operate to communicate directly to the UE 130 via the link 128 without the mediation or control of the cellular network.

The UE 126 includes the components discussed above in FIG. 1 and further comprises a scheduling component 202 and a decoding (deriving) component 204 to facilitate communication of D2D data. For example, the scheduling component 202 can schedule a scheduling assignment (SA) transmission with the D2D data comprising control information over an SA cycle comprising a plurality of sub-frames. The sub-frames can be available resources between periodic transmissions of a scheduling assignment of another transmission frame or packet. The SA provides control information with one or more parameters that describe subsequent data being transmitted such as for modulation and coding processes, resources for transmission, predefined mapping rules, a selected mapping scheme or other parameters for decoding or detection of direct communication from the UE 126 or other UE device.

Alternatively, predefined rules for mapping or decoding the PDUs from the sub-frames of each SA cycle can be stored in a memory or pre-specified. However, the scheduling component 202 can is alternatively schedule the scheduling assignment (SA) transmission comprising the control information over the plurality of sub-frames with PDU mapping rules according to a selection of the PDU mapping scheme. The mapping scheme can be selected by the scheduling component 202 or another component according to a complexity level, an encryption level, an access/load of resources being utilized the UE 126 or as detected by the UE 130 that is being contacted or receiving D2D data initially in the D2D communication mode.

In one example, a consecutive mapping scheme or process can be scheduled or selected by the scheduling component 202. A non-consecutive mapping scheme of PDUs and corresponding retransmissions can alternatively be selected for D2D communications. A pseudo-random mapping scheme could also be selected, for example. The scheduling component 202 could also schedule different mapping schemes for mapping PDUs into the logical resource pool between SA cycles so that a sequence of different mapping schemes is generated among different SA transmissions based on a UE 126 identity or another UE identity associated with it.

The deriving component 204 is configured to derive SA sub-frames that are available to enable D2D data transmission between subsequent SA transmissions based on the T-RPT. For example, the deriving component 204 can extract the mapping rules or an indication of the mapping scheme from an SA cycle, frame or transmission, predefined in memory or selected from the scheduling component 202. The deriving component 204 can further utilize such mapping rules to calculate resource indexes for retransmission of each PDU from a logical sub-frame pool available for transmissions from a current D2D node or UE device 126. In addition, the deriving component 204 can also operate to decode sub-frames along time transmission intervals being received and comprising an initially transmitted PDU and one or more PDU retransmissions between a first SA cycle/transmission and a second SA cycle/transmission as a function of a T-RPT.

In one aspect, the UE 126 operates to communicate the D2D data 206 as a T-RPT defined over an SA scheduling cycle 208 between SA occurrences/transmissions, such as a first SA transmission 210 and a second/subsequent SA transmission 212. The available resources between SA transmissions define the SA scheduling cycle 208, which comprise sub-frames of a logical D2D resource pool, as potential time slots or time transmission intervals (TTIs) that can be used between periodic SA transmissions. The D2D communication component 132 (as a transmitter, receiver or transceiver) can utilize the T-RPT to recognize the sub-frames used for a particular D2D data transmission.

Each of the sub-frames or slots between the SA 210 and 212 provide a time transmission interval and the highlighted sub-frames 214 provide transmission opportunities in TTIs for the UE 126 as a current D2D node. For example, each PDU can be specified for transmission at particular time instances at particular sub-frames within the SA cycle, which can be transmitted in control information of an SA for a subsequent SA cycle (not shown). The highlighted or bolded sub-frames 214 therefore comprise opportunities for transmission of a portion of a PDU or its corresponding retransmission. Each PDU can be communicated in one or more sub-frames, while the PDUs of an SA cycle can be carried or encapsulated within a subset of the sub-frames, or less than all sub-frames of an SA cycle 208, for example. The PDU portions, for example, can include three sub-frames for each PDU or PDU retransmission, a lessor number of sub-frames or a greater number. A subset of sub-frames (less than all in a single SA cycle 208) can have no PDUs or portions of PDUs contained therein, while other sub-frames are dispersed throughout the logical resource pool that contain a PDU, a portion of a PDU or portion of a PDU retransmission.

In one aspect, a single SA transmission 210 of control information operates to schedule data transmission over multiple sub-frames 214 as time transmission intervals—TTIs in order to efficiently utilize available data resources along a logical resource pool. When multiple data transmission instances are available between consecutive SA transmissions 210 and 212, for example, signaling informs receivers of the UE 130 about parameters of the subsequent D2D data transmission 212. In particular, the receiver shall be aware about the amount of PDUs scheduled and amount of retransmission used for each PDU. In addition, the D2D receiver (communication component 132) of the UEs 126, 130 should know the particular time instances used by the transmitter or communication component 132 for each PDU and its retransmission in order to do proper signal processing (e.g. LLR combining) at the receiver side. In one example, if SAs are transmitted once per 40 ms/80 ms/160 ms/320 ms the signaling of the position of MAC PDU transmission and retransmission will result in significant system overhead and inefficient design of SA physical structure. In order to address this issue, the predefined mapping rules are utilized by the UE 126 in a D2D communication mode by D2D transmitters and D2D receivers in order to derive the time instances for initial transmissions of PDUs and their retransmissions.

Figure 3:
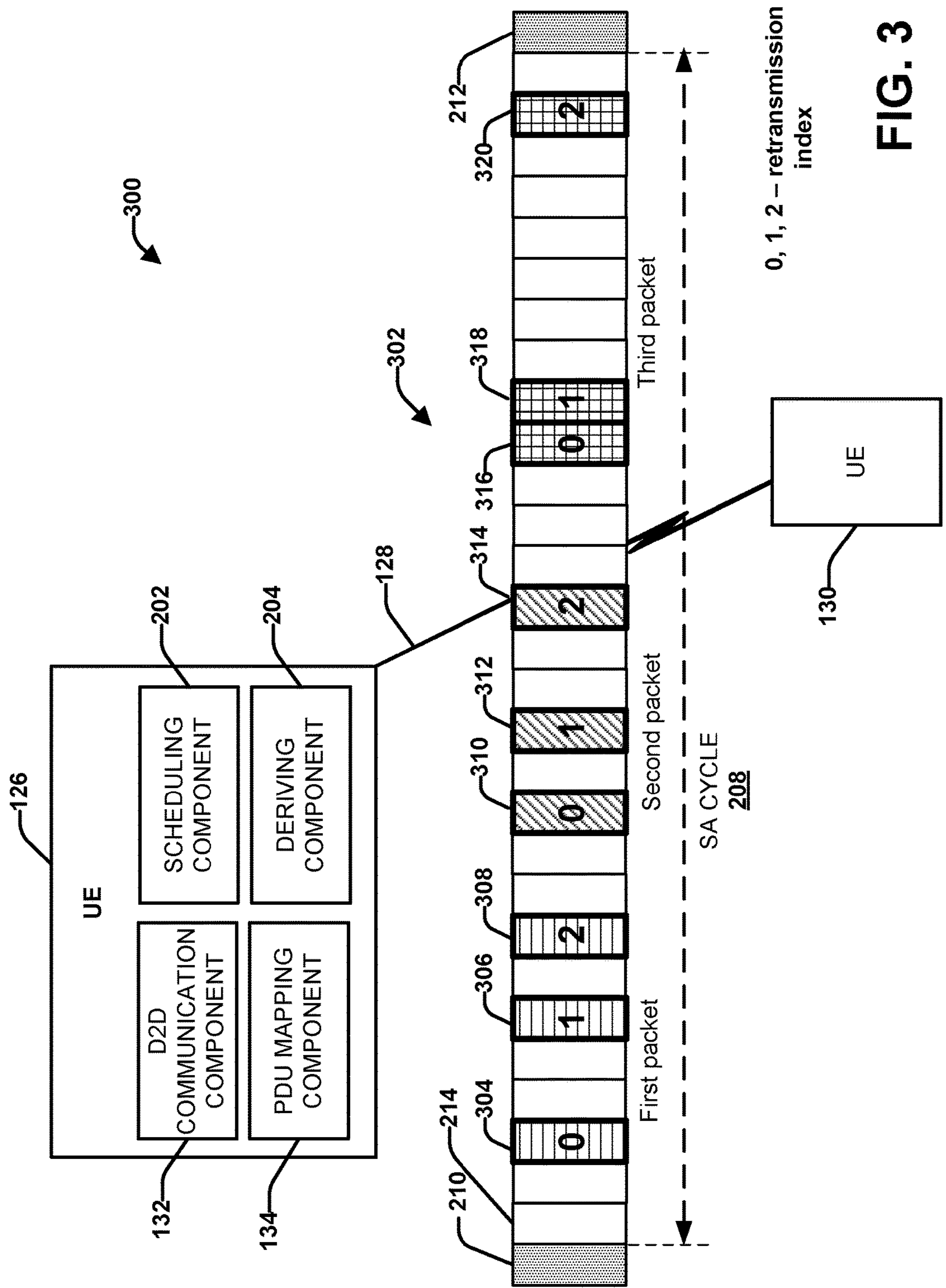
FIG. 3 is a UE in D2D communication mode communicating with mapped D2D data that can be utilized according to various aspects.

Referring to FIG. 3, illustrated is an example of a consecutive mapping scheme that can be generated by a UE in a D2D communication mode according to various aspects described herein. With the consecutive mapping scheme 300 of FIG. 3, retransmissions of corresponding PDUs are transmitted consecutively along a logical resource pool of sub-frames.

An SA region 302 of D2D data being communicated in a D2D communication link 128 between the UE 126 and the UE 130 illustrates a cross section of multiple SA transmissions 210 and 212 and transmission opportunities in an SA region, for example. Each rectangle portion (e.g., sub-frame 214) illustrated among the SA region 302, whether highlighted, bolded or not, represents a TTI or an available resource for transmission among the pool of resources between the first SA transmission 210 and the second SA transmission 212.

An initial PDU 304 and subsequent retransmissions 306 and 308, for example, are illustrated within the SA cycle 208, in which three different TTIs or sub-frames are utilized. In addition, a second, initial PDU 310 with corresponding retransmissions 312, 314 and a third, initial PDU 316 with corresponding retransmissions 318, 320 are mapped within the SA cycle 208 between two SA transmissions 210 and 212. The number of PDU retransmissions can be a consistent number of one or more retransmissions corresponding to each initial PDU 304, 310 or 316, or vary in number with each initial PDU 304, 310, 316. In addition, SA cycles can comprise different numbers of initial PDUs and their corresponding retransmissions. For example, the SA cycle 208, as illustrated, comprises three initial PDUs 304, 310, 316 and corresponding transmissions 306, 308, 312, 314, 318, 320, which provide for three different packets or groups of PDUs and retransmissions. One of ordinary skill in the art can appreciate that more or less packets of PDUs and retransmission(s) could be mapped and communicated via link 128 in a D2D communication mode. In addition, a different number of retransmissions among the first, second and third packets or among different SA cycles between SA signaling transmissions could also be mapped.

This consecutive mapping scheme 300 demonstrates a T-RPT, in which a single SA transmission 210 indicates the T-RPT being utilized with a single SA cycle 208, and references or points to multiple PDUs and their corresponding retransmission for the single SA cycle 208. The receiving UE 130 is then enabled to decode or derive the sub-frames with PDUs among the logical D2D resource pool for a particular D2D data transmission based on the T-RPT. An advantage of the consecutive mapping scheme option is the reduced PDU transmission latency and lower requirement for the receiver buffer size of the UE 130, for example, or UE 126. The following mapping equation can be used by the PDU mapping component 134 in the case of consecutive PDU mapping scheme and retransmission mapping over the SA cycle 208:

$$i_k^n = nN_{TTI} + k, 0 \le i_k^n \le N_{TTI} \cdot N_{PDU} - 1.$$

The $N_{PDU}$ parameter represents the number of PDUs to be mapped in a single SA scheduling cycle 208. The $N_{PDU}$ parameter can be implemented in the signaled SA 210, for example, as a message or configured by the upper layers, such as being (pre)configured by a radio resource control (RRC) message or system information block (SIB) signaling. Additionally, the $N_{TTI}$ parameter represents a number of retransmissions for a PDU, for example. Likewise, the $N_{TTI}$ parameter can be either signaled in the SA message or configured by the upper layers such as being (pre)configured by RRC or SIB signaling. In addition, the range of $0 \le k \le N_{TTI} - 1$ represents a retransmission index of a given PDU within the scheduling cycle 208, for example. The range of $0 \le n \le N_{PDU} - 1$ further represents an index of PDUs being transmitted within the SA scheduling cycle 208. The parameter $i_k^n$ represents a D2D sub-frame index (inside T-RPT) for the k-th retransmission of the n-th PDU.

The consecutive mapping scheme expressed above can be selected by the scheduling component 202 and mapped into the SA cycle 208 by the PDU mapping component 134 so that each PDU and corresponding packet (initial PDU and associated retransmissions) is consecutively mapped among the sub-frames as TTIs. A portion of those sub-frames can include a PDU or a PDU retransmission within the sub-frame, while another portion can include other data or contain no PDU or no PDU retransmission. Alternatively, all the sub-frames can comprise PDUs or vary in amount or among particular TTIs of each SA cycle, for example.

The advantage of the consecutive mapping 300 of D2D data is the reduced PDU transmission latency and a lower requirement for the receiver (e.g., UE 130) buffer size in processing or decoding via a decoding (deriving) component thereat. However, a potential factor in selecting a consecutive mapping by the scheduling component 202 could be that it utilizes an increased UE power consumption for D2D communication in a D2D communication mode. Because even if the UE 130, for example, can decode the D2D data from a first initial attempt or initial PDU, the UE 130 has to be awake for the whole SA cycle 208 in order to receive all PDUs 304, 310, 316. Other mapping schemes could also be selected that provide for less power consumption by a UE depending upon power consumption or resource needs at the time of the D2D communication mode for example as well.

Figure 4:
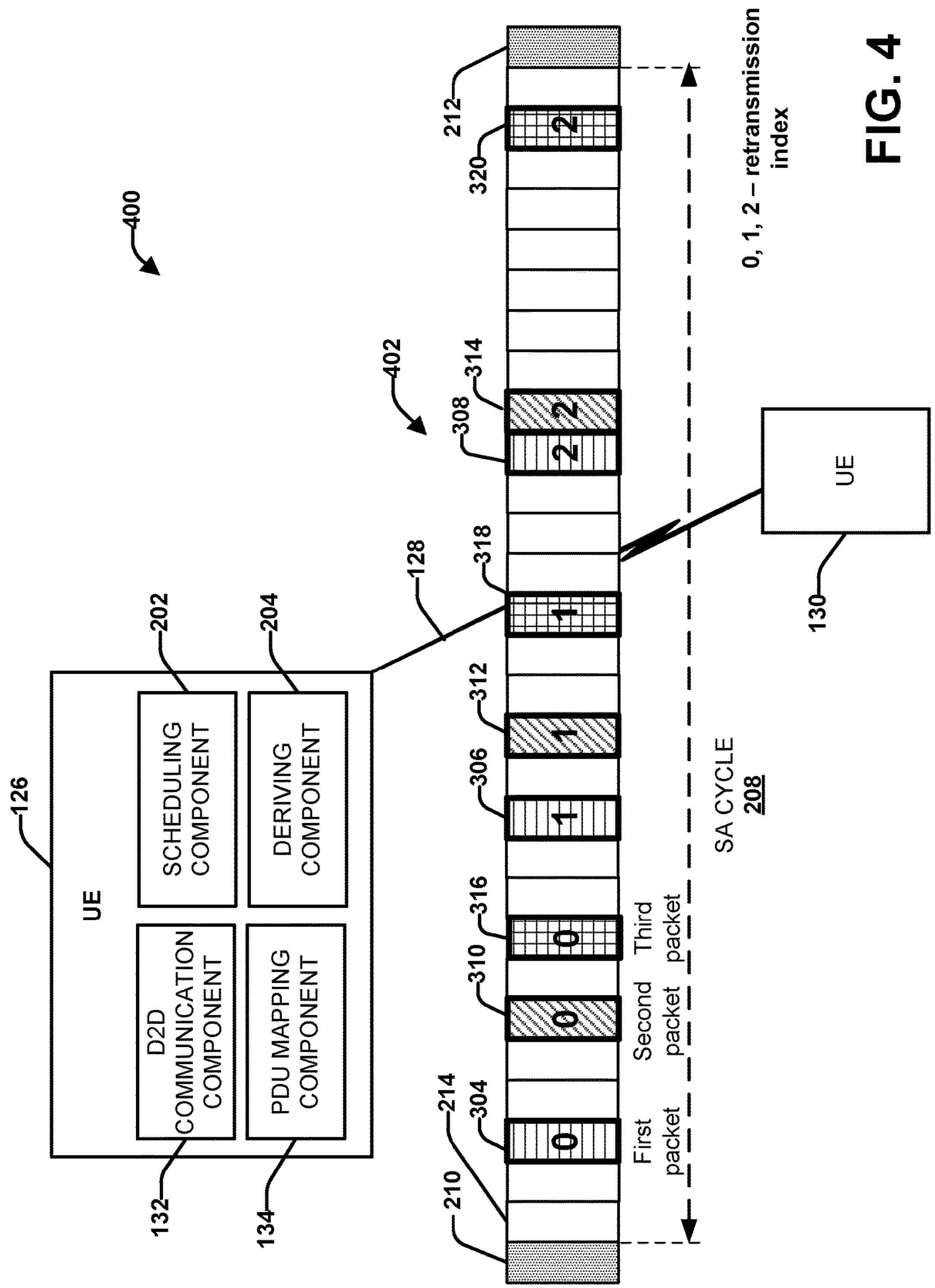
FIG. 4 is another UE in D2D communication mode communicating with mapped D2D data that can be utilized according to various aspects.

Referring to FIG. 4, illustrated is another example of an interleaved mapping 400 of D2D data that can be generated by a UE in a D2D communication mode according to various aspects described herein. The mapping 400 includes an SA region 402 of a logical resource pool with mapped PDUs within a T-RPT according to an interleaving or an interleaving mapping scheme. The receiving UE 130 decodes the D2D data based on the T-RPT in order to process the PDUs or any retransmissions.

In response to a selection/utilization of the interleaved mapping scheme 400, the initial transmission 402 of all PDUs 304, 310, and 316, for example, are transmitted first, before the PDU retransmissions 306, 308, 312, 314, 318, and 320. The initial PDU transmissions 304, 310, and 316 are followed by the first PDU retransmissions 306, 312, and 318 of corresponding PDU packets (initial PDU and retransmission(s)) and followed by the second retransmission 308, 314, and 320, which are transmitted one by one for all PDUs in an interleaved order. Each of the retransmissions 306, 308, 312, 314, 318, and 320 corresponding to an initial PDU 304, 310, 316 are transmitted after all the initial PDUs are transmitted and in an interleaved order, as opposed to a consecutive sequence, in which each packet (initial PDU and any corresponding retransmissions) is transmitted consecutively and entirely before the next (e.g., each packet comprising the initial PDU and retransmission(s)). The retransmissions 306, 312, 318 and 308, 314, and 320 associated with a packet can have can have a randomized order or a linearly shifted order with the first retransmissions 306, 312, 318 associated with the first, second and third packet being transmitted before second retransmissions 308, 314, and 320 of each packet are transmitted along the SA cycle 208.

In one aspect, the retransmissions being transmitted correspond in order according to the order of the initial PDUs 304, 310, 316. Alternatively or additionally, the initial PDUs can be transmitted in a different order of an interleaved sequence associated with packets 0, 1, 2 (e.g., 1, 0, 2, or other initial sequence). In another aspect, the first retransmissions 306, 312, 318 of the interleaved mapping could be transmitted in an order that corresponds to the order of the initial PDUs 304, 310, and 316, or in a different order along the sub-frames of the SA cycle 208.

The interleaving mapping scheme 400 can extract larger time diversity gains because each individual packet (initial PDU and its corresponding retransmission(s)) is transmitted over a longer period of time—i.e. along the whole SA scheduling cycle 208. Moreover, if the receiving D2D UE 130 has a channel propagation condition that satisfies a quality threshold to the transmitting UE 126, it could successfully decode all PDUs 304, 310, 316 from the first transmission of the initial PDUs 304, 310, 316 and subsequently sleep or power down for lower power consumption for the remainder of time of the SA scheduling cycle 208. In this case, the remaining retransmissions processing could be skipped for efficient energy saving either by the UE 126 in transmission or the UE 130 in receiving/decoding the remainder of the SA cycle 208. Thus, the interleaved mapping scheme 400 could be selected based on a lower power consumption being desired by the UE 130 than the consecutive mapping scheme 300 or lower than the decoding utilized by the receiving UE 130 with other mapping schemes.

The following mapping equation can be used in case of interleaved PDU and retransmission mapping over SA cycle:

$$i_k^n = kN_{PPU} + (N_{PDU} + n - k) \bmod N_{PDU},$$
$$0 \le i_k^n \le N_{TTI} \cdot N_{PPU} - 1.$$

As discussed above with respect to the consecutive mapping scheme of FIG. 3, the $N_{PDU}$ parameter represents the number of PDUs to be mapped in a single SA scheduling cycle 208. The $N_{PDU}$ parameter can be implemented in the signaled SA 210, for example, as a message or configured by the upper layers, such as being (pre)configured by a radio resource control (RRC) message or system information block (SIB) signaling. Additionally, the $N_{TTI}$ parameter represents a number of retransmissions for a PDU. Likewise, the $N_{TTI}$ parameter can be either signaled in the SA message or configured by the upper layers such as being (pre) configured by RRC or SIB signaling. In addition, the range of $0 \le k \le N_{TTI} - 1$ represents a retransmission index of a given PDU within the scheduling cycle 208, for example. The range of $0 \le n \le N_{PDU} - 1$ further represents an index of PDUs being transmitted within the SA scheduling cycle 208. The parameter $i_k^n$ represents a D2D sub-frame index (inside T-RPT) for the k-th retransmission of the n-th PDU.

Figure 5:
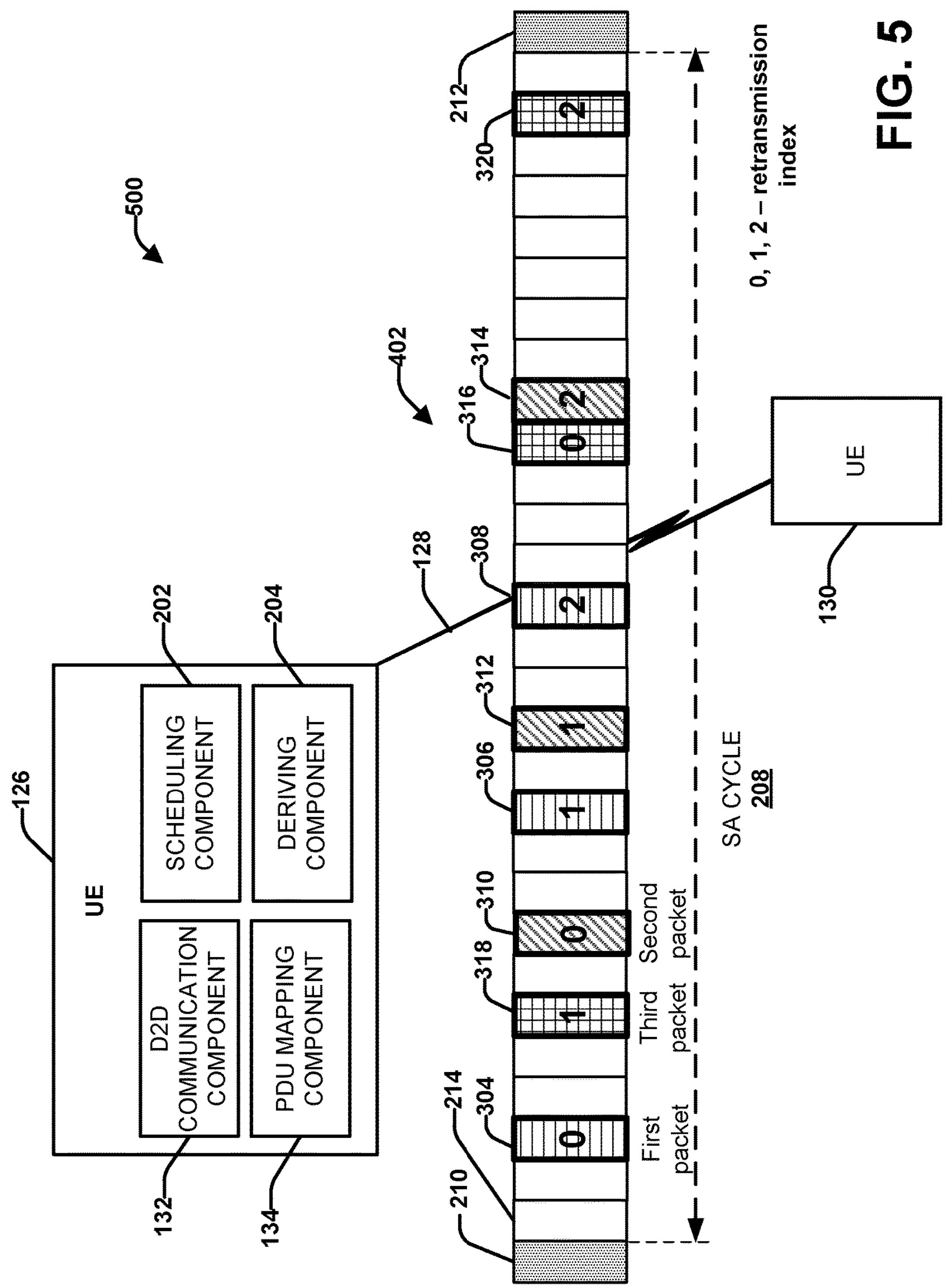
FIG. 5 is another UE in D2D communication mode communicating with mapped D2D data that can be utilized according to various aspects.

Referring to FIG. 5, illustrated is another example of a mapping scheme that includes a pseudo-random mapping scheme 500 in accordance with various aspects. The mapping scheme 500 includes a pseudo-random mapping scheme 500 demonstrated by example along an SA region 502. In this mapping scheme 500, the order of initial PDU transmissions and retransmissions is randomized using pseudo-random generation rule for exploiting time diversity gains.

The pseudo-random PDU mapping can be performed by the PDU mapping component 134 in response to a scheduled selection, or a fixed determination. For example, at a first process or operation, the PDU mapping component 134 is configured to pseudo-randomly generate a sequence of permuted indexes P from 1 to $N_{TTI}N_{PDU}$, P=ƒ(seed), where ƒ—is a pseudo-random permutation function. The seed of the pseudo-random permutation function can be a function of one or more parameters, such as, for example, the D2D transmitter/group identity, position of the SA message transmission in the SA pool, synchronization or SA cycle/period, or other parameter. The seed function can be from initial parameters that also include random values. Alternatively or additionally, the seed can be (pre)configured by the network in UE-specific function based on a particular UE 126, 130 or in a common manner/function for any UE.

The PDU mapping component 134, at a second process or operation of the pseudo-random mapping, can determine the sets of indexes for mapping of all transmissions of each PDU $Q_n(k) = P(nN_{TTI} + k)$ and sort them in increasing order $Q_n^s = \mathrm{sort}(Q_n)$. The following equation can be used in the pseudo-random mapping process over the SA cycle 208:

$$i_k^n = Q_n^s(k), 0 \le i_k^n \le N_{TTI} \cdot N_{PDU} - 1.$$

The SA region 502 demonstrates an example pseudo-random order of packets with initial PDUs and retransmissions according to the pseudo-random scheme 500. Each horizontal-lined highlighted sub-frame represents a portion or a PDU of a first packet, while each diagonal-line highlighted sub-frame represents a portion or a PDU of a second packet, and each grid-patterned sub-frame represents a portion or a PDU of a third packet for example. The sub-frames with PDUs are randomly dispersed, for example. The initial PDU 304 of the first packet is transmitted first in a T-RPT of the SA cycle 208. The second PDU 318 of the second packet is transmitted next, for example, with the first PDU 310 of the second packet then follows, and so on as illustrated. Other random sequences can also be envisioned, and the particular TTIs or sub-frames at different time instances can also be arranged in different locations or sub-frames other than the same, for example.

While the methods described within this disclosure are illustrated in and described herein as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

Figure 6:
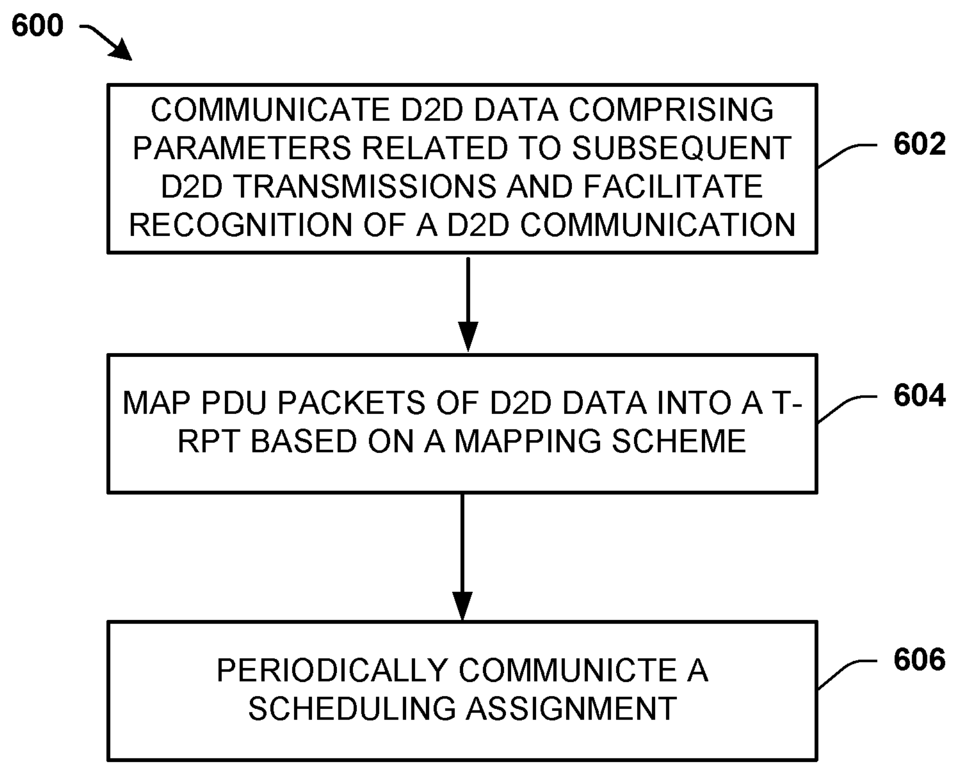
FIG. 6 is a flow diagram illustrating a method for a D2D communication according to various aspects disclosed.

Referring to FIG. 6, illustrated is an example process flow 600 for D2D communications between UE devices in accordance with various aspects described herein. The UE can be configured to switch between the D2D communication and a cellular network communication via a cell network of a cell network device, for example.

At 602, the method 600 initiates with communicating, via a first UE (e.g., UE 126), D2D data comprising parameters related to subsequent D2D transmissions and facilitate a recognition of a D2D communication from the UE 126 or by the UE 126, for example.

At 604, the method 600 further comprises mapping packet data units (PDUs 304, 306, 308, 310, 312, 314, 316, 318, or 320) of the D2D data into a T-RPT based on a PDU mapping scheme among a plurality of sub-frames (e.g., the SA cycle 208) comprising time transmission intervals (TTIs). The mapping of the PDUs can comprise mapping an initial PDU and one or more corresponding PDU retransmissions into the plurality of sub-frames between a first SA 210 and a subsequent SA 212. At least a portion of the plurality of sub-frames without the PDUs separate another portion of the plurality of sub-frames with the PDUs mapped therein.

For example, the mapping of the PDUs further can comprise at least one of: mapping a PDU and corresponding retransmissions consecutively from one another into a subset of the TTIs of the plurality of sub-frames within a scheduling assignment cycle according to a consecutive mapping scheme 300; mapping the PDU and the corresponding retransmissions with interleaving sub-frames into a subset of the TTIs of the plurality of sub-frames according to an interleaving mapping scheme 400 within the scheduling assignment cycle 208; or mapping the PDU and the corresponding retransmissions in a pseudo-random sequence into a subset of the TTIs of the plurality of sub-frames according to a pseudo-random mapping scheme within the scheduling assignment cycle.

At 606, communicating the D2D data further comprises periodically communicating a scheduling assignment (SA) that indicates an initiation of the T-RPT in a single transmission and references the TTIs with PDUs between a first SA 210 of the single transmission and a second SA 212 of a subsequent transmission.

In one embodiment, a mapping scheme can be selected to dictate the mapping of the PDUs among the plurality of sub-frames of the TTIs based on one or more criteria. This criteria can include whether a set mapping scheme is indicated, a variable mapping scheme, a power consumption level, a current power consumption capability of a receiving UE 130 (e.g., an interleaving scheme could be selected for lower power, and a pseudo-random scheme could be generated for a greater complexity or security). Predetermined criteria, for example, could be a level of complexity (e.g. in encryption, security, etc.) that a UE 126 could set for the particular D2D link with a particular UE 130, the various mapping rules, as well as a scheduling decision, a traffic load or type, latency requirements, power consumption level desired for QoE or QoS or other criteria for a UE 126 or 130.

Figure 7:
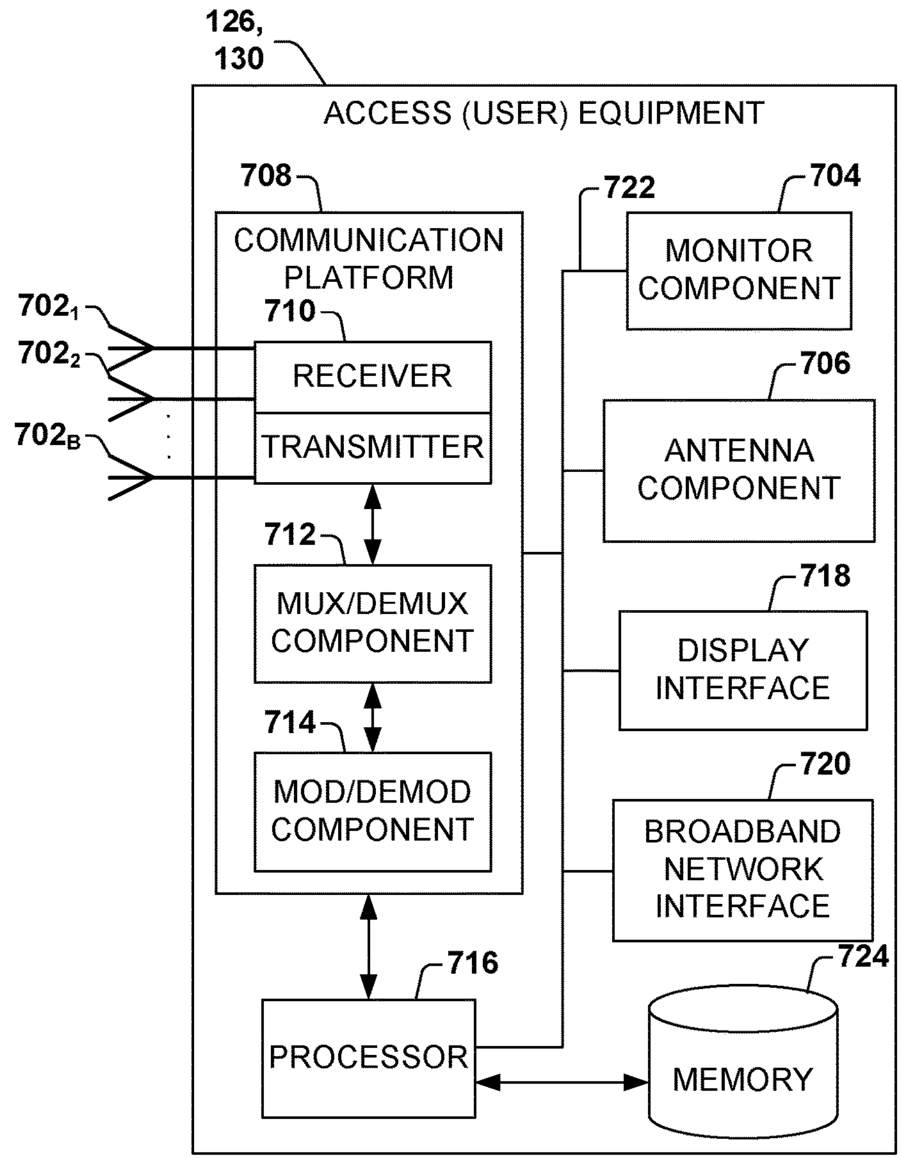
FIG. 7 is an illustration of an example wireless network platform to implement various aspects disclosed.

To provide further context for various aspects of the disclosed subject matter, FIG. 7 illustrates a block diagram of an embodiment of access (user) equipment 126, 130 related to access of a network (e.g., base station, wireless access point, femtocell access point, and so forth) that can enable and/or exploit features or aspects disclosed herein.

Access equipment, UE and/or software 126, 130 related to access of a network can receive and transmit signal(s) from and to wireless devices, wireless ports, wireless routers, etc. through segments $\mathbf{702}_1$-$\mathbf{702}_B$ (B is a positive integer). Segments $\mathbf{702}_1$-$\mathbf{702}_B$ can be internal and/or external to access equipment and/or software 126, 130 related to access of a network, and can be controlled by a monitor component 704 and an antenna component 706. Monitor component 704 and antenna component 706 can couple to communication platform 708, which can include electronic components and associated circuitry that provide for processing and manipulation of received signal(s) and other signal(s) to be transmitted.

In an aspect, communication platform 708 includes a receiver/transmitter 710 that can convert analog signals to digital signals upon reception of the analog signals, and can convert digital signals to analog signals upon transmission. In addition, receiver/transmitter 710 can divide a single data stream into multiple, parallel data streams, or perform the reciprocal operation. Coupled to receiver/transmitter 710 can be a multiplexer/demultiplexer 712 that can facilitate manipulation of signals in time and frequency space. Multiplexer/demultiplexer 712 can multiplex information (data/traffic and control/signaling) according to various multiplexing schemes such as time division multiplexing, frequency division multiplexing, orthogonal frequency division multiplexing, code division multiplexing, space division multiplexing. In addition, multiplexer/demultiplexer component 712 can scramble and spread information (e.g., codes, according to substantially any code known in the art, such as Hadamard-Walsh codes, Baker codes, Kasami codes, polyphase codes, and so forth).

A modulator/demodulator 714 is also a part of communication platform 708, and can modulate information according to multiple modulation techniques, such as frequency modulation, amplitude modulation (e.g., M-ary quadrature amplitude modulation, with M a positive integer); phase-shift keying; and so forth).

Access equipment and/or software 126, 130 related to access of a network also includes a processor 716 configured to confer, at least in part, functionality to substantially any electronic component in access equipment and/or software 126, 130. In particular, processor 716 can facilitate configuration of access equipment and/or software 126, 130 through, for example, monitor component 704, antenna component 706, and one or more components therein. Additionally, access equipment and/or software 126, 130 can include display interface 718, which can display functions that control functionality of access equipment and/or software 126, 130, or reveal operation conditions thereof. In addition, display interface 718 can include a screen to convey information to an end user. In an aspect, display interface 718 can be a liquid crystal display, a plasma panel, a monolithic thin-film based electrochromic display, and so on. Moreover, display interface 718 can include a component (e.g., speaker) that facilitates communication of aural indicia, which can also be employed in connection with messages that convey operational instructions to an end user. Display interface 718 can also facilitate data entry (e.g., through a linked keypad or through touch gestures), which can cause access equipment and/or software 126, 130 to receive external commands (e.g., restart operation).

Broadband network interface 720 facilitates connection of access equipment and/or software 126, 130 to a service provider network (not shown) that can include one or more cellular technologies (e.g., third generation partnership project universal mobile telecommunication system, global system for mobile communication, and so on) through backhaul link(s) (not shown), which enable incoming and outgoing data flow. Broadband network interface 720 can be internal or external to access equipment and/or software 126, 130, and can utilize display interface 718 for end-user interaction and status information delivery.

Processor 716 can be functionally connected to communication platform 708 and can facilitate operations on data (e.g., symbols, bits, or chips) for multiplexing/demultiplexing, such as effecting direct and inverse fast Fourier transforms, selection of modulation rates, selection of data packet formats, inter-packet times, and so on. Moreover, processor 716 can be functionally connected, through data, system, or an address bus 722, to display interface 718 and broadband network interface 720, to confer, at least in part, functionality to each of such components.

In access equipment and/or software 126, 130, memory 724 can retain location and/or coverage area (e.g., macro sector, identifier(s)) access list(s) that authorize access to wireless coverage through access equipment and/or software 126, 130, sector intelligence that can include ranking of coverage areas in the wireless environment of access equipment and/or software 126, 130, radio link quality and strength associated therewith, or the like. Memory 724 also can store data structures, code instructions and program modules, system or device information, code sequences for scrambling, spreading and pilot transmission, access point configuration, and so on. Processor 716 can be coupled (e.g., through a memory bus), to memory 724 in order to store and retrieve information used to operate and/or confer functionality to the components, platform, and interface that reside within access equipment and/or software 126, 130.

As it employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," data storage," "database," and substantially any other information storage component relevant to operation and functionality of a component and/or process, refer to "memory components," or entities embodied in a "memory," or components including the memory. It is noted that the memory components described herein can be either volatile memory or nonvolatile memory, or can include both volatile and nonvolatile memory.

By way of illustration, and not limitation, nonvolatile memory, for example, can be included in a memory, non-volatile memory (see below), disk storage (see below), and memory storage (see below). Further, nonvolatile memory can be included in read only memory, programmable read only memory, electrically programmable read only memory, electrically erasable programmable read only memory, or flash memory. Volatile memory can include random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to include, without being limited to including, these and any other suitable types of memory.

Examples can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Example 1 is an apparatus for use in a user equipment (UE) device. The apparatus comprises a device-to-device (D2D) communication component configured to switch between a D2D communication and a cellular network communication, and transmit or receive D2D data comprising one or more parameters related to a subsequent D2D communication that enable a recognition of the subsequent D2D communication. A packet data unit (PDU) mapping component configured to map PDUs of the D2D data into a time resource pattern for transmission (T-RPT) based on a PDU mapping scheme to generate the D2D communication.

Example 2 includes the subject matter of example 1, wherein the executable components further comprise a scheduling component configured to schedule a scheduling assignment transmission with the D2D data comprising control information over an scheduling assignment cycle comprising a plurality of sub-frames.

Example 3 includes the subject matter of any of examples 1-2, including or omitting optional features, wherein the scheduling component is further configured to schedule the scheduling assignment transmission comprising the control information over the plurality of sub-frames with PDU mapping rules according to a selection of the PDU mapping scheme.

Example 4 includes the subject matter of any of examples 1-3, including or omitting optional features, wherein the parameters comprise at least one of: an indication of an amount of PDUs, a number of PDU retransmissions corresponding to the PDUs respectively, particular time instances corresponding to transmissions of the PDUs, and particular time instances corresponding to retransmissions of the PDUs.

Example 5 includes the subject matter of any of examples 1-4, including or omitting optional features, wherein the D2D communication component is further configured to transmit a first scheduling assignment that indicates the T-RPT in a single transmission and references a subset of sub-frames comprising the PDUs between the first scheduling assignment and a second SA.

Example 6 includes the subject matter of any of examples 1-5, including or omitting optional features, wherein the executable components further comprise: a deriving component configured to derive sub-frames that are available to enable D2D data transmission between subsequent scheduling assignment transmissions based on the T-RPT.

Example 7 includes the subject matter of any of examples 1-6, including or omitting optional features, wherein the PDU mapping component is further configured to select the PDU mapping scheme from among a plurality of PDU mapping schemes based on a set of predetermined criteria.

Example 8 includes the subject matter of any of examples 1-7, including or omitting optional features, wherein the PDU mapping scheme comprises a consecutive mapping, wherein the D2D communication component is further configured to transmit one or more retransmissions of a PDU consecutively after initially transmitting the PDU, wherein the PDU and the one or more retransmissions comprise a subset of sub-frames between scheduling assignment transmissions.

Example 9 includes the subject matter of any of examples 1-8, including or omitting optional features, wherein the PDU mapping scheme comprises an interleaved PDU mapping, wherein the D2D communication component is configured to interleave retransmissions corresponding to a PDU in sub-frames between scheduling assignment transmissions after transmitting the PDU.

Example 10 includes the subject matter of any of examples 1-9, including or omitting optional features, wherein the PDU mapping scheme comprises a pseudo-random PDU mapping, wherein the D2D communication component is configured to transmit a PDU and retransmissions corresponding to the PDU based on a random sequencing of sub-frames associated with the PDU and sub-frames associated with each of the retransmissions.

Example 11 is a computer-readable storage device storing executable instructions that, in response to execution, cause a system comprising a processor to perform operations. The operations comprises communicating, via a first user equipment (UE), device-to-device (D2D) data comprising parameters related to subsequent D2D transmissions that facilitate a recognition of a D2D communication from the UE; and mapping, based on a PDU mapping scheme, packet data units (PDUs) of the D2D data into a time resource pattern for transmission (T-RPT) throughout a plurality of sub-frames comprising time transmission intervals.

Example 12 includes the subject matter of example 11, including or omitting optional features, wherein the communicating the D2D data further comprises periodically communicating a scheduling assignment (SA) that indicates an initiation of the T-RPT in a single transmission and references the TTIs with PDUs between a first SA of the single transmission and a second SA of a subsequent transmission.

Example 13 includes the subject matter of any of examples 11-12, including or omitting optional features, wherein the operations further comprise: switching, via the UE, between the D2D communication and a cellular network communication.

Example 14 includes the subject matter of any of examples 11-13, including or omitting optional features, wherein the operations further comprise: communicating control information with the PDUs mapped into a subset of the TTIs among the plurality of sub-frames in a single transmission that indicates a number of PDUs, a number of PDU retransmissions corresponding to each of the PDUs, a first set of time instances corresponding to the PDUs respectively, and a second set of time instances corresponding to the PDU retransmissions respectively, to be communicated in a subsequent transmission.

Example 15 includes the subject matter of any of examples 11-14, including or omitting optional features, wherein the operations further comprise: selecting a mapping scheme to dictate the mapping of the PDUs among the plurality of sub-frames of the TTIs based on one or more criteria.

Example 16 includes the subject matter of any of examples 11-15, including or omitting optional features, wherein the mapping of the PDUs further comprises at least one of: mapping a PDU and corresponding retransmissions consecutively from one another into a subset of the TTIs of the plurality of sub-frames within a scheduling assignment cycle according to a consecutive mapping scheme; mapping the PDU and the corresponding retransmissions with interleaving sub-frames into a subset of the TTIs of the plurality of sub-frames according to an interleaving mapping scheme within the scheduling assignment cycle; and mapping the PDU and the corresponding retransmissions in a pseudo-random sequence into a subset of the TTIs of the plurality of sub-frames according to a pseudo-random mapping scheme within the scheduling assignment cycle.

Example 17 includes the subject matter of any of examples 11-16, including or omitting optional features, wherein the mapping of the PDUs comprises mapping an initial PDU and one or more corresponding PDU retransmissions into the plurality of sub-frames between a first SA and a subsequent SA, wherein a portion of the plurality of sub-frames without the PDUs separate another portion of the plurality of sub-frames with the PDUs mapped therein.

Example 18 is a user equipment (UE) device configured to communicate in a device-to-device (D2D) communication mode and a cellular network communication mode comprising: a memory storing executable components; and a processor, coupled to the memory, configured to facilitate execution of the executable components. A mapping component is configured map a packet data unit (PDU) and one or more PDU retransmissions corresponding to the PDU into a scheduling assignment (SA) cycle of an SA transmission, and is a transceiver configured to transmit or receive the SA transmission and facilitate subsequent communications in the D2D communication mode based on the SA cycle.

Example 19 includes the subject matter of Example 18, including or omitting optional features, wherein the mapping component is further configured to map the PDU into a first plurality of time transmission intervals, and the one or more PDU retransmissions into a second plurality of time transmission intervals, within a portion of a plurality of time transmission intervals between a first SA of the SA transmission and a second SA of a subsequent SA transmission.

Example 20 includes the subject matter of any of examples 18-19, including or omitting optional features, wherein the SA transmission comprises a first SA that indicates an initiation of the SA cycle and comprises control information with parameters that are related to a subsequent SA transmission and facilitate decoding of the subsequent SA transmission based on the control information.

Example 21 includes the subject matter of any of examples 18-20, including or omitting optional features, wherein the parameters comprise a number of PDUs being scheduled, and number of retransmissions for each corresponding PDU, to enable a determination of a position of sub-frames within the scheduling assignment (SA) cycle that have the PDU and the one or more PDU retransmissions.

Example 22 includes the subject matter of any of examples 18-21, including or omitting optional features, a deriving component configured to decode sub-frames with time transmission intervals comprising the PDU and the one or more PDU retransmissions between a first SA and a second SA as a function of a time resource pattern of transmission.

Example 23 includes the subject matter of any of examples 18-22, including or omitting optional features, wherein the mapping component is further configured to map the PDU and the one or more PDU retransmissions based on an interleaving mapping scheme that enables a lower power consumption in a sleep mode of operation during a decoding of the SA cycle during the D2D communication mode.

Example 24 includes the subject matter of any of examples 18-23, including or omitting optional features, wherein the mapping component is further configured to map the PDU and the one or more PDU retransmissions equidistantly and interleaved from one another into a time resource pattern of the SA cycle.

Example 25 includes the subject matter of any of examples 18-23, including or omitting optional features, wherein the mapping component is further configured to map the PDU and the one or more PDU retransmissions based on a pseudo-random mapping scheme by generating a sequence of permuted indexes for the PDU and the one or more PDU retransmissions.

Example 26 is a user equipment (UE) device, comprising a memory storing executable components. A processor, coupled to the memory, is configured to execute the executable components comprising a device-to-device (D2D) communication component configured to switch between a D2D communication and a cellular network communication, and transmit or receive D2D data comprising one or more parameters related to a subsequent D2D communication that enable a recognition of the subsequent D2D communication. A packet data unit (PDU) mapping component configured to map PDUs of the D2D data into a time resource pattern for transmission (T-RPT) based on a PDU mapping scheme to generate the D2D communication.

Example 27 includes the subject matter of example 26, wherein the executable components further comprise a scheduling component configured to schedule a scheduling assignment transmission with the D2D data comprising control information over an scheduling assignment cycle comprising a plurality of sub-frames.

Example 28 includes the subject matter of any of examples 26-27, including or omitting optional features, wherein the scheduling component is further configured to schedule the scheduling assignment transmission comprising the control information over the plurality of sub-frames with PDU mapping rules according to a selection of the PDU mapping scheme.

Example 29 includes the subject matter of any of examples 26-28, including or omitting optional features, wherein the parameters comprise at least one of: an indication of an amount of PDUs, a number of PDU retransmissions corresponding to the PDUs respectively, particular time instances corresponding to transmissions of the PDUs, and particular time instances corresponding to retransmissions of the PDUs.

Example 30 includes the subject matter of any of examples 26-29, including or omitting optional features, wherein the D2D communication component is further configured to transmit a first scheduling assignment that indicates the T-RPT in a single transmission and references a subset of sub-frames comprising the PDUs between the first scheduling assignment and a second SA.

Example 31 includes the subject matter of any of examples 26-30, including or omitting optional features, wherein the executable components further comprise: a deriving component configured to derive sub-frames that are available to enable D2D data transmission between subsequent scheduling assignment transmissions based on the T-RPT.

Example 32 includes the subject matter of any of examples 26-31, including or omitting optional features, wherein the PDU mapping component is further configured to select the PDU mapping scheme from among a plurality of PDU mapping schemes based on a set of predetermined criteria.

Example 33 includes the subject matter of any of examples 26-32, including or omitting optional features, wherein the PDU mapping scheme comprises a consecutive mapping, wherein the D2D communication component is further configured to transmit one or more retransmissions of a PDU consecutively after initially transmitting the PDU, wherein the PDU and the one or more retransmissions comprise a subset of sub-frames between scheduling assignment transmissions.

Example 34 includes the subject matter of any of examples 26-33, including or omitting optional features, wherein the PDU mapping scheme comprises an interleaved PDU mapping, wherein the D2D communication component is configured to interleave retransmissions corresponding to a PDU in sub-frames between scheduling assignment transmissions after transmitting the PDU.

Example 35 includes the subject matter of any of examples 26-34, including or omitting optional features, wherein the PDU mapping scheme comprises a pseudo-random PDU mapping, wherein the D2D communication component is configured to transmit a PDU and retransmissions corresponding to the PDU based on a random sequencing of sub-frames associated with the PDU and sub-frames associated with each of the retransmissions.

It is to be understood that aspects described herein can be implemented by hardware, software, firmware, or any combination thereof. When implemented in software, functions can be stored on or transmitted over as one or more instructions or code on a computer-readable medium. Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration. Additionally, at least one processor can comprise one or more modules operable to perform one or more of the s and/or actions described herein.

For a software implementation, techniques described herein can be implemented with modules (e.g., procedures, functions, and so on) that perform functions described herein. Software codes can be stored in memory units and executed by processors. Memory unit can be implemented within processor or external to processor, in which case memory unit can be communicatively coupled to processor through various means as is known in the art. Further, at least one processor can include one or more modules operable to perform functions described herein.

Techniques described herein can be used for various wireless communication systems such as CDMA, TDMA, FDMA, OFDMA, SC-FDMA and other systems. The terms "system" and "network" are often used interchangeably. A CDMA system can implement a radio technology such as Universal Terrestrial Radio Access (UTRA), CDMA1800, etc. UTRA includes Wideband-CDMA (W-CDMA) and other variants of CDMA. Further, CDMA1800 covers IS-1800, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.18, Flash-OFDM∟, etc. UTRA and E-UTRA are part of Universal Mobile Telecommunication System (UMTS). 3GPP Long Term Evolution (LTE) is a release of UMTS that uses E-UTRA, which employs OFDMA on downlink and SC-FDMA on uplink. UTRA, E-UTRA, UMTS, LTE and GSM are described in documents from an organization named "3rd Generation Partnership Project" (3GPP). Additionally, CDMA1800 and UMB are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Further, the actions of a method or algorithm described in connection with aspects disclosed herein can be embodied directly in hardware, in a software module executed by a processor, or a combination thereof. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the s and/or actions of a method or algorithm can reside as one or any combination or set of codes and/or instructions on a machine-readable medium and/or computer readable medium, which can be incorporated into a computer program product.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature may have been disclosed with respect to only one of several implementations, such feature may be combined with one or more other features of the other implementations as may be desired and advantageous for any given or particular application.

What is claimed is:

1. An apparatus for use in a user equipment (UE) device, the apparatus comprising:

a device-to-device (D2D) communication component configured to switch between a D2D communication and a cellular network communication, and transmit or receive D2D data comprising one or more parameters related to a subsequent D2D communication that enable a recognition of the subsequent D2D communication; and a packet data unit (PDU) mapping component configured to map PDUs of the D2D data into a time resource pattern for transmission (T-RPT) based on a PDU mapping scheme to generate the D2D communications;

wherein the PDU mapping scheme comprises a consecutive mapping, wherein the D2D communication component is further configured to transmit one or more retransmissions of a PDU consecutively after initially transmitting the PDU, wherein the PDU and the one or more retransmissions comprise a subset of sub-frames between scheduling assignment transmissions.

2. The apparatus of claim 1, wherein the executable components further comprise:

a scheduling component configured to schedule a scheduling assignment transmission with the D2D data comprising control information over an scheduling assignment cycle comprising a plurality of sub-frames.

3. The apparatus of claim 2, wherein the scheduling component is further configured to schedule the scheduling assignment transmission comprising the control information over the plurality of sub-frames with PDU mapping rules according to a selection of the PDU mapping scheme.

4. The apparatus of claim 1, wherein the one or more parameters comprise at least one of: an indication of an amount of PDUs, a number of PDU retransmissions corresponding to the PDUs respectively, particular time instances corresponding to transmissions of the PDUs, and particular time instances corresponding to retransmissions of the PDUs.

5. The apparatus of claim 1, wherein the D2D communication component is further configured to transmit a first scheduling assignment that indicates the T-RPT in a single transmission and references the subset of sub-frames comprising the PDUs between the first scheduling assignment and a second SA.

6. The apparatus of claim 1, wherein the executable components further comprise:

a deriving component configured to derive sub-frames that are available to enable D2D data transmission between the subsequent scheduling assignment transmissions based on the T-RPT.

7. The apparatus of claim 1, wherein the PDU mapping component is further configured to select the PDU mapping scheme from among a plurality of PDU mapping schemes based on a set of predetermined criteria.

8. The apparatus of claim 7, wherein the plurality of PDU mapping schemes comprise an interleaved PDU mapping scheme, wherein the D2D communication component is configured to interleave retransmissions corresponding to a PDU in sub-frames between scheduling assignment transmissions after transmitting the PDU in response to a selection of the interleaved PDU mapping scheme.

9. The apparatus of claim 7, wherein the plurality of PDU mapping schemes comprise a pseudo-random PDU mapping scheme, wherein the D2D communication component is configured to transmit a PDU and retransmissions corresponding to the PDU based on a random sequencing of sub-frames associated with the PDU and sub-frames associated with the retransmissions in response to a selection of the pseudo-random PDU mapping scheme.

10. A non-transitory computer-readable medium storing executable instructions that, in response to execution, cause a system comprising a processor to perform operations, comprising:

communicating, via a first user equipment (UE), device-to-device (D2D) data comprising parameters related to a subsequent D2D transmission that enables a recognition of a D2D communication from the UE;

mapping, based on a PDU mapping scheme, packet data units (PDUs) of the D2D data into a time resource pattern for transmission (T-RPT) throughout a plurality of sub-frames comprising time transmission intervals;

mapping a PDU and corresponding retransmissions into a scheduling assignment (SA) cycle of an SA transmission to enable the subsequent D2D communication based on the SA cycle, wherein the SA transmission comprises a first SA that indicates an initiation of the SA cycle and comprises control information with parameters related to the subsequent SA transmission; and enable decoding of the subsequent SA transmission based on the control information.

11. The non-transitory computer-readable medium of claim 10, wherein the communicating the D2D data further comprises periodically communicating a scheduling assignment that indicates an initiation of the T-RPT in a single transmission and references the TTIs with PDUs between a first SA of the single transmission and a second SA of the subsequent SA transmission.

12. The non-transitory computer-readable medium of claim 10, wherein the operations further comprise:

switching, via the UE, between the D2D communication and a cellular network communication.

13. The non-transitory computer-readable medium of claim 10, wherein the operations further comprise:

communicating the control information with the PDUs mapped into a subset of the TTIs among the plurality of sub-frames in a single transmission that indicates a number of PDUs, a number of PDU retransmissions corresponding to each of the PDUs, a first set of time instances corresponding to the PDUs respectively, and a second set of time instances corresponding to the PDU retransmissions respectively, to be communicated in the subsequent SA transmission.

14. The non-transitory computer-readable medium of claim 10, wherein the operations further comprise:

selecting the PDU mapping scheme to dictate the mapping of the PDUs among the plurality of sub-frames of the TTIs based on one or more criteria.

15. The non-transitory computer-readable medium of claim 10, wherein the mapping of the PDUs further comprises at least one of:

mapping the PDU and the corresponding retransmissions consecutively from one another into a subset of the TTIs of the plurality of sub-frames within the SA cycle according to a consecutive mapping scheme;

mapping the PDU and the corresponding retransmissions with interleaving sub-frames into a subset of the TTIs of the plurality of sub-frames according to an interleaving mapping scheme within the SA cycle; or mapping the PDU and the corresponding retransmissions in a pseudo-random sequence into a subset of the TTIs of the plurality of sub-frames according to a pseudo-random mapping scheme within the SA cycle.

16. The non-transitory computer-readable medium of claim 10, wherein the mapping of the PDUs comprises mapping an initial PDU and one or more of the corresponding PDU retransmissions into the plurality of sub-frames between the first SA and a subsequent SA, wherein a portion of the plurality of sub-frames without the PDUs separate another portion of the plurality of sub-frames with the PDUs mapped therein.

17. A user equipment (UE) device configured to communicate in a device-to-device (D2D) communication mode and a cellular network communication mode comprising:

a memory storing executable components;

a processor, coupled to the memory, configured to facilitate execution of the executable components comprising:

a mapping component configured map a packet data unit (PDU) and one or more PDU retransmissions corresponding to the PDU into a scheduling assignment (SA) cycle of an SA transmission; and a transceiver configured to transmit or receive the SA transmission and facilitate subsequent communications in the D2D communication mode based on the SA cycle;

wherein the SA transmission comprises a first SA that indicates an initiation of the SA cycle and comprises control information with parameters that are related to a subsequent SA transmission and facilitate decoding of the subsequent SA transmission based on the control information.

18. The UE device of claim 17, wherein the mapping component is further configured to map the PDU into a first plurality of time transmission intervals, and the one or more PDU retransmissions into a second plurality of time transmission intervals, within a portion of a plurality of time transmission intervals between a first SA of the SA transmission and a second SA of a subsequent SA transmission.

19. The UE device of claim 17, wherein the parameters comprise a number of PDUs being scheduled, and number of retransmissions for each corresponding PDU, to enable a determination of a position of sub-frames within the SA cycle that have the PDU and the one or more PDU retransmissions.

20. The UE device of claim 17, further comprising:

a deriving component configured to decode sub-frames with time transmission intervals comprising the PDU and the one or more PDU retransmissions between a first SA and a second SA as a function of a time resource pattern of transmission.

21. The UE device of claim 17, wherein the mapping component is further configured to map the PDU and the one or more PDU retransmissions based on an interleaving mapping scheme that enables a lower power consumption in a sleep mode of operation during a decoding of the SA cycle during the D2D communication mode.

22. The UE device of claim 17, wherein the mapping component is further configured to map the PDU and the one or more PDU retransmissions equidistantly and interleaved from one another into a time resource pattern of the SA cycle.

23. The UE device of claim 17, wherein the mapping component is further configured to map the PDU and the one or more PDU retransmissions based on a pseudo-random mapping scheme by generating a sequence of permuted indexes for the PDU and the one or more PDU retransmissions.

* * * * *